(12) United States Patent
Paramesh et al.

(10) Patent No.: US 7,197,336 B2
(45) Date of Patent: Mar. 27, 2007

(54) METHOD AND APPARATUS TO COMBINE RADIO FREQUENCY SIGNALS

(75) Inventors: Jeyanandh Paramesh, Hillsboro, OR (US); Krishnamurthy Soumyanath, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 390 days.

(21) Appl. No.: 10/608,544

(22) Filed: Jun. 30, 2003

(65) Prior Publication Data

US 2004/0266485 A1 Dec. 30, 2004

(51) Int. Cl.
*H04M 1/00* (2006.01)
*G01S 3/16* (2006.01)

(52) U.S. Cl. .................. 455/562.1; 342/382

(58) Field of Classification Search ........... 342/153, 342/360, 380, 381, 382, 383, 423, 430, 432, 342/434, 437, 445, 446; 455/13.3, 20, 23, 455/500, 70, 83, 553.1, 103, 562.1, 108, 455/116, 121, 134, 205, 220
See application file for complete search history.

(56) References Cited

U.S. PATENT DOCUMENTS

| | | | |
|---|---|---|---|
| 5,465,271 A | | 11/1995 | Hladik et al. |
| 5,841,400 A | * | 11/1998 | Hiramatsu .................. 342/382 |
| 6,430,215 B1 | * | 8/2002 | Kinoshita et al. ........... 375/147 |
| 6,577,686 B1 | * | 6/2003 | Koga et al. .................. 375/347 |
| 6,590,528 B1 | * | 7/2003 | DeWulf .................. 342/357.12 |
| 2001/0009861 A1 | * | 7/2001 | Martin et al. ................ 455/562 |
| 2002/0158800 A1 | * | 10/2002 | Aoyama ....................... 342/378 |
| 2002/0186750 A1 | * | 12/2002 | Callaway et al. ........... 375/141 |
| 2003/0083031 A1 | * | 5/2003 | Eriksson et al. ......... 455/250.1 |

FOREIGN PATENT DOCUMENTS

| | | |
|---|---|---|
| EP | 1 187 365 | 3/2002 |
| EP | 1 215 814 | 6/2002 |
| GB | 2 340 354 | 2/2000 |

OTHER PUBLICATIONS

Ellinger, et al., "An Antenna Diversity MMIC Vector Modulator for HIPERLAN with Low Power Consumption and Calibration Capability", IEEE Transactions on Microwave Theory and Techniques, vol. 49, No. 5, May 2001.

International Search Report for PCT/US2004/017427, mailed Oct. 28, 2004.

\* cited by examiner

*Primary Examiner*—Quochien B. Vuong
*Assistant Examiner*—Dominic E. Rego
(74) *Attorney, Agent, or Firm*—Pearl Cohen Zedek Latzer LLP

(57) ABSTRACT

The invention concerns 2-oxo-1-pyrrolidine derivatives and a process for preparing them and their uses. The invention also concerns a process for preparing α-ethyl-2-oxo-1-pyrrolidine acetamide derivatives from unsaturated 2-oxo-1-pyrrolidine derivatives. Particularly the invention concerns novel intermediates and their use in methods for the preparation of S-α-ethyl-2oxo-1-pyrrolidine acetamide.

10 Claims, 3 Drawing Sheets

METHOD AND APPARATUS TO COMBINE RADIO FREQUENCY SIGNALS

BACKGROUND OF THE INVENTION

Devices of wireless communication network may use dual antennas and/or antenna arrays to improve the network capacity and data rates. The devices may use antenna selection techniques and/or antenna diversity techniques to select one of the antennas to receive or transmit signals. Those techniques may consume valuable power and calculation time of the processors used in the wireless devices. Furthermore, according to those techniques, only one antenna at a time may be used.

Thus, there is a need for better ways to combine the signals received by the above described antennas to improve the capacity and data transmission rate of wireless communication networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
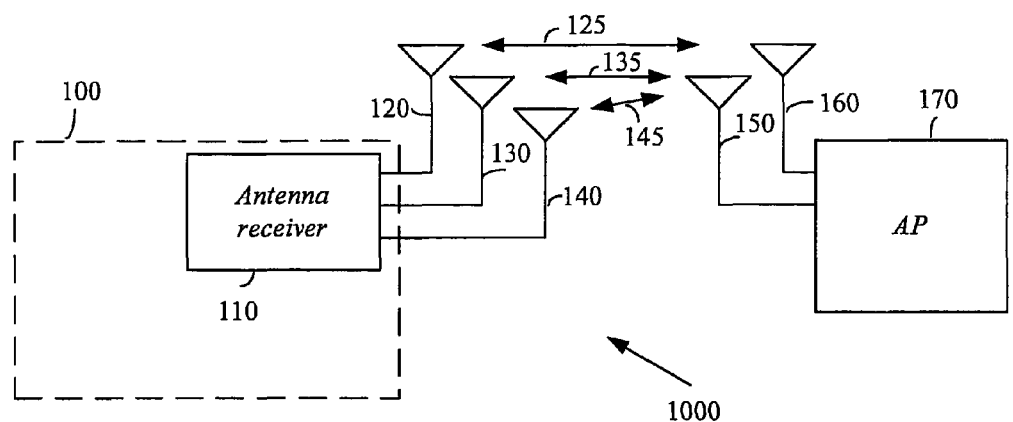
FIG. 1 is a schematic illustration of a portion of a wireless communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing term such as "plurality" may be used throughout the specification to describe two or more components, devices, elements, parameters and the like. For example, "plurality of antennas" describes two or more antennas.

It should be understood that the present invention may be used in a variety of applications. Although the present invention is not limited in this respect, the circuits and techniques disclosed herein may be used in many apparatuses such as units of a wireless communication system, such as, for example, a wireless local area network (WLAN) communication system, cellular communication systems, two way communication systems, and the like. Units of WLAN communication system intended to be included within the scope of the present invention include, by way of example only, wireless communication devices, mobile units (MU), mobile stations, access points (AP), public APs and the like. Units of cellular communication system intended to be included within the scope of the present invention includes MUs, base stations, and the like.

Types of WLAN communication systems intended to be within the scope of the present invention include, although are not limited to, "IEEE-Std 802.11, 1999 Edition (ISO/IEC 8802-11:1999)" standard, and more particularly in "IEEE-Std 802.11b-1999, IEEE-Std 802.11a, IEEE-Std 802.11g, IEEE-Std 802.11j, or the like.

Turning to FIG. 1, a portion of a wireless communication system 1000 according to embodiments of the present invention is shown. Although the scope of the present invention is not limited in this respect, the portion of wireless communication system 1000 may include a wireless communication device 100 which may include an antenna receiver 110 to provide a combined radio frequency (RF) signal. Antenna receiver 110 may receive RF signals via antennas 120, 130, and 140. The RF signals may be transmitted by a wireless communication device 170 via antennas 150 and 160, although the number of antennas that may be connected to the antenna receiver 110 is in no way limited to three antennas.

Although the scope of the present invention is not limited in this respect, wireless communication system 1000 may be a WLAN or a wireless metropolitan-area networks (WMAN) that may use the spatial domain in order to improve WLAN and/or WMAN network capacity and data rates. Wireless communication device 170 may include, for example, an AP of WLAN that may transmit RF signals by using beam-forming techniques. Furthermore wireless communication device 170 may transmit RF signals through channels 125, 135, 145. In some embodiments of the invention, channels 125, 135, 145 may be uncorrelated channels, which may be separated by at least one wavelength, if desired. The uncorrelated channel (e.g. channel 125) may be characterized by some characteristics such as, for example, frequency, modulation, noise, fading, load and the like.

Figure 2:
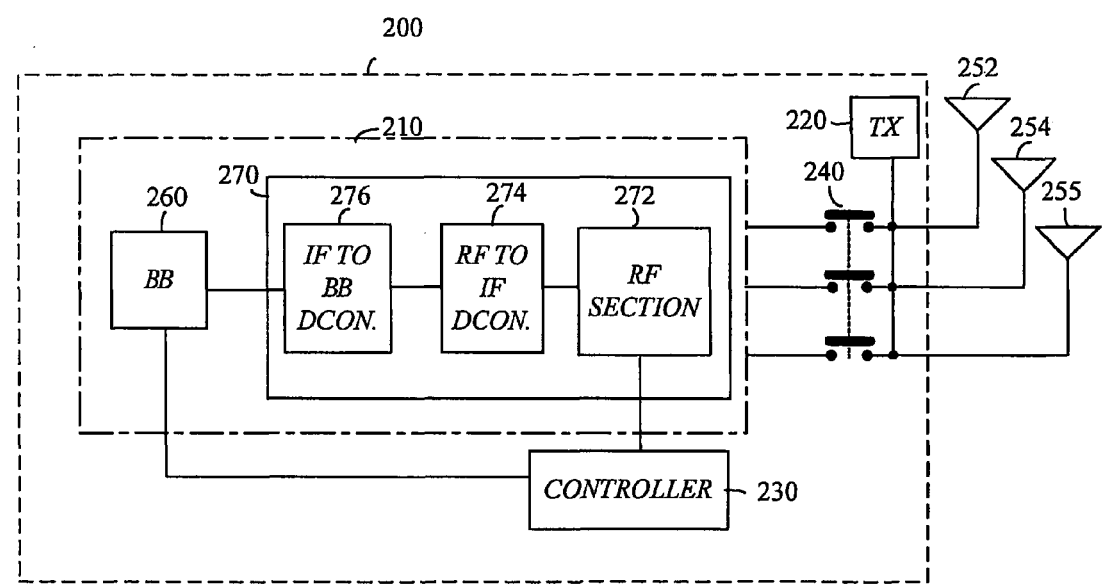
FIG. 2 is a block diagram of a communication device according to an exemplary embodiment of the present invention.

Turning to FIG. 2, a block diagram of a communication device 200, for example, a wireless communication device, according to an exemplary embodiment of the invention is shown. Although the scope of the present invention is not limited in this respect, communication device 200 may include a receiver (RX) 210, a transmitter (TX) 220 and a controller 230 that may control an antenna switch 240. Antennas 252, 254, 255 may be coupled to communication device 200. Although the scope of the present invention is not limited in this respect, antennas 252, 254, 255 may be for example, dipole antennas, omni-directional antennas, highly-directional, steerable antennas, and the like.

Although the scope of the present invention is not limited in this respect, receiver 210 may include a baseband (BB) unit 260 and an antenna receiver 270. In this exemplary embodiment of the invention, antenna receiver 270 may include a RF section 272 that may combine RF signals received via antennas 252, 254, 255, a RF to intermediate frequency (IF) downconverter (DCON) 274 that may downconvert the combined RF signal provided by RF section 272 to an IF signal, and an IF to BB downconverter (DCON) 276 that may convert the IF signal to a BB signal, if desired.

It should be understood by one skilled in the art that in alternative embodiments of the present invention, the number of antennas that may be coupled to communication device 200 may vary from a single antenna to any number of antennas. The number of antennas may be limited only by the physical capacity of the communication device 200.

Although the scope of the present invention is not limited in this respect, controller 230 may select the antennas by controlling antenna switch 240. Furthermore, antenna switch 240 may toggle communication device 200 between transmit to receive modes, if desired. TX 220 may transmit RF signals via antennas 252, 254, 255, and BB unit 260 may process the signals received by antennas 252, 254 and 255 according to a protocol of the desired communication system, for example, a cellular communication system, a WLAN communication system, and the like.

Figure 3:
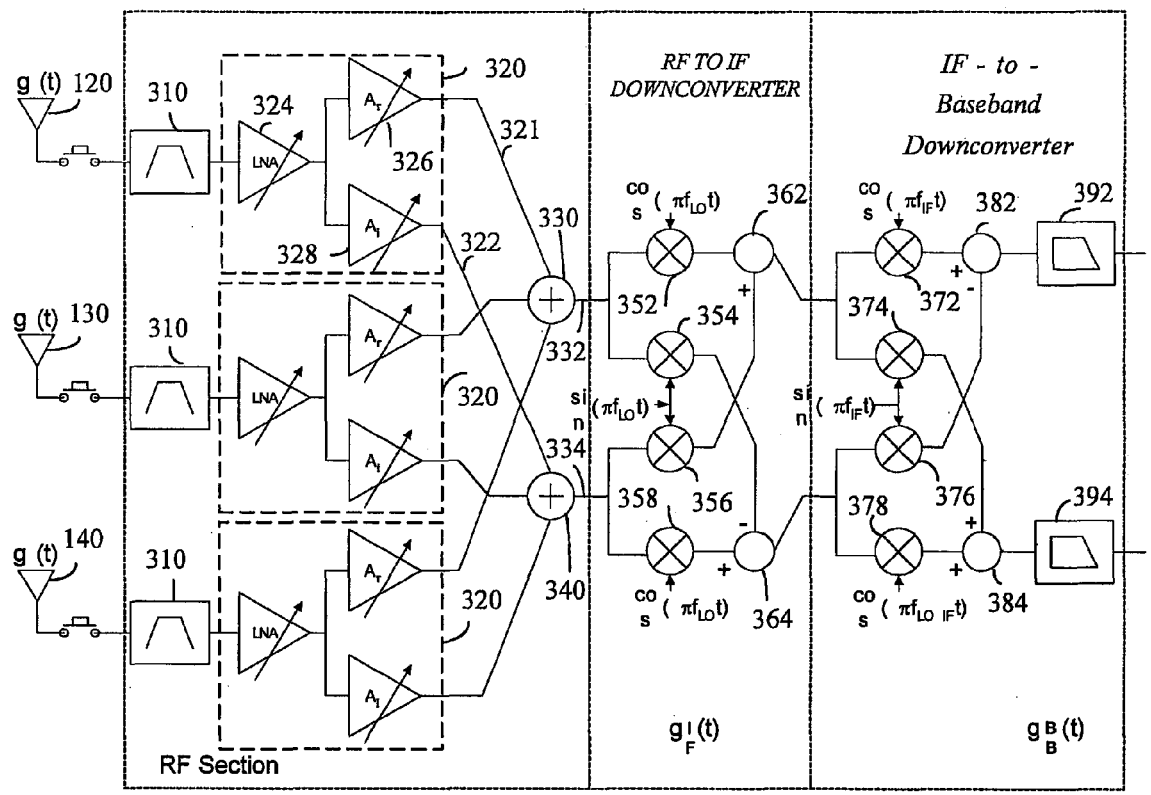
FIG. 3 is a schematic illustration of an antenna receiver according to an exemplary embodiment of the present invention.

Turning to FIG. 3, a schematic illustration of an antenna receiver 300 according to exemplary embodiment of the present invention is shown. Although the scope of the present invention is not limited in this respect, antenna receiver 300 may be divided into three portions (shown with dotted lines), for example, a RF section 301, a RF to IF downconverter 302 and an IF-to-BB down converter 303. The RF section 301 may include bandpass filters 310 and antenna weighted value generators 320 that may each generate real and imaginary components 321, 322, respectively, of an antenna weighted value.

Although the scope of the present invention is not limited in this respect, at least one of antenna weight value generators 320 may include a variable linear amplifier (LNA) 324, for example, a variable linear law noise amplifier, a variable amplifier 326, and a variable amplifier 328. LNA 324 may adjust the amplitude of the RF signal received by the antenna, for example, antenna 120. Variable amplifier 326 may adjust the phase of the RF signal received by the antenna, for example antenna 120, and may provide real component 321 of the antenna weighted value. Variable amplifier 328 may adjust the phase of the RF signal received by the antenna, for example antenna 120, and may provide imaginary component 322 of the antenna weighted value. Real components 321 of the antennas weighted values may be combined by an adder 330 to provide a real component 332 of a combined antenna weighted signal, and imaginary components 322 of the antennas weighted values may be combined by an adder 340 to provide an imaginary component 334 of a combined antenna weighted signal.

Although the scope of the present invention is not limited in this respect, antenna weighted value generator may provide the antenna weighted value based on a manipulation of a value derived from an amplitude of the RF signal received by the antenna with a value derived from a phase of the RF signal received by the antenna, for example, antenna 120, as described in detail below. LNA 324 may adjust the amplitude of the received signal; and variable amplifier 326 and 328 may adjust the phase of the amplitude-adjusted received signal.

Although the scope of the present invention is not limited in this respect, LNA 324 may be a variable gain amplifier and variables amplifiers 326, 328 may be adjustable phase amplifiers, if desired.

Although the scope of the present invention is not limited in this respect, the RF-to-IF downconverter section 302 may include mixers 352, 354, 356, 358 that may mix the real component 332 of the combined antenna weighted signal (mixers 352, 354) and the imaginary component 334 of the combined antenna weighted signal (mixers 356, 358) with two local oscillator (LO) signals, $\cos(2\pi f_{RFLO}t)$ and $\sin(2\pi f_{RFLO}t)$. Mixers 352, 354 and mixers 356, 358 may downconvert the RF signals into real and imaginary IF signals, respectively. The downconverted real and imaginary signals may be combined by combiners 362 and 364. Combiner 362 may provide a real IF signal and combiner 364 may provide an imaginary IF signal.

Although the scope of the present invention is not limited in this respect, the IF-to-BB downconverter section 303 may include mixers 372, 374, 376, 378 that may further mix the real IF signal (mixers 372, 374) and the imaginary IF signal (mixers 376, 378) with two local oscillator (LO) signals, $\cos(2\pi f_{IFLO}t)$ and $\sin(2\pi f_{IFLO}t)$. Mixers 372, 374 and mixers 376, 378 may downconverter the IF signals into real and imaginary BB signals, respectively. The downconverted real and imaginary signals may be combined by combiners 382 and 384. Combiner 382 may provide a real BB signal and combiner 384 may provide an imaginary BB signal. In some embodiments of the invention, the real and imaginary BB signals may be filtered by lowpass filters 392 and 394, respectively.

Although the scope of the present invention is not limited in this respect, embodiments of antenna weight value generator 320 may use a suitable mathematical algorithm to manipulate the amplitude and/or phase of the RF signals received by antennas 120, 130, 140, to produce the antenna weight value, if desired. Antenna weight value generator 320 may be implemented by hardware, software, or by any suitable combination of hardware and/or software.

Although the scope of the present invention is not limited in this respect, a digitally modulated transmitted signal may generally be represented by:

$$s(t)=Re[\tilde{s}(t)\exp(j2\pi f_c t)]=s_1(t)\cos(2\pi f_c t)-s_Q(t)\sin(2\pi f_c t) \quad \text{(Equation 1)}$$

wherein, $\tilde{s}(t)$ may be a complex-envelope of the signal s(t) and $f_c$ is the transmitted carrier frequency. In some embodiments of the invention, a channel, for example channel 125, may cause path-loss and/or signal fading, the latter being time-variant. Channels 125, 135, 145 may be uncorrelated or correlated channels.

Consequently, the signal received at a $k^{th}$ antenna may represented by:

$$g_k(t)=Re[\tilde{g}_k(t)\exp(j2\pi f_c t)]=g_{Ik}(t)\cos(2\pi f_c t)-g_{Qk}(t)\sin(2\pi f_c t) \quad \text{(Equation 2)}$$

wherein, the complex envelope $\tilde{g}_k(t)$ may be related to the complex-envelope of the signal transmitted through a certain channel weight. More specifically, the signal received at the $k^{th}$ antenna may be represented by:

$$\tilde{g}_k(t)=C_k\exp(j\theta_k)\tilde{s}(t). \quad \text{(Equation 3)}$$

wherein, $C_k$ and $\theta_k$ are channel amplitude and phase parameters respectively.

Although the scope of the present invention is not limited in this respect, antenna weighted value generator 320 may manipulation of a value derived from an amplitude of the received signal, for example, the complex-envelope $\tilde{g}_k(t)$ and a value derived from a phase of the received signal, for example, $A_k \exp(j\phi_k)$. Antenna weighted value generator 320 may weigh the complex-envelope $\tilde{g}_k(t)$ with a programmable antenna weight, for example, $A_k \exp(j\phi_k)$, wherein $A_k$ may represent a gain and $\phi_k$ may represent a phase-shift in an antenna path. Furthermore, in some embodiments of the invention, the antenna weighted value may be computed on a periodic basic based on channel estimation information ($C_k$ and $\theta_k$) which may be estimated from the received signal, if desired.

Although the scope of the present invention is not limited in this respect, the combination of the variable gain of LNA 324 and the gains $A_r$ and $A_i$ of amplifiers 326 and 328 may be used to realize the corresponding phase-shift. Thus, the complex IF signal at the output of the RF-to-IF downconverter may be described by:

$$g_{IF}(t) = \frac{1}{2} \sum G_{LNA,k}(A_{rk} + jA_{ik})[\tilde{g}_k(t) \exp(j2\pi f_{IF}t) + \tilde{g}_k^*(t) \exp\{j2\pi(2f_c + f_{IF})t\}] \quad \text{(Equation 4)}$$

wherein, $G_{LNA,k}$ may be the magnitude of the antenna weight value, $A_{rk}$ and $A_{ik}$ may be the real and imaginary parts of the antenna weight value and $f_{IF}$ may be the frequency of the intermediate frequency. The BB signal may be described by:

$$g_{BB}(t) = \frac{1}{2} \sum G_{LNA,k}(A_{rk} + jA_{ik})\tilde{g}_k(t) \quad \text{(Equation 5)}$$

Equation 5 may be re-written as follows:

$$g_{BB}(t) = \frac{1}{2} \sum A_k \exp(j\varphi_k)\tilde{g}_k(t) \quad \text{(Equation 6)}$$

wherein, $$g_{BB}(t) = G_{LNA,k}\sqrt{A_{rk}^2 + A_{ik}^2} \text{ and } \varphi_k = \tan^{-1}\frac{A_{ik}}{A_{rk}}.$$

Figure 4:
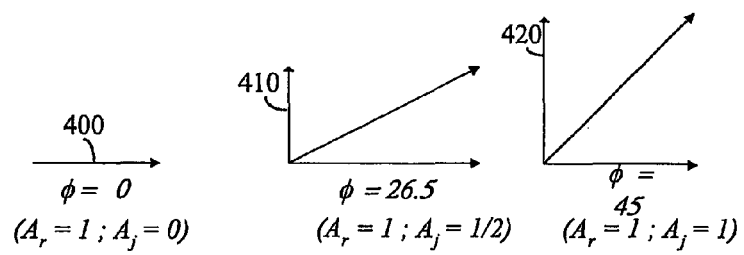
FIG. 4 is an illustration of graphs useful in demonstrating a weighting operation of an antenna weight value generator according to an exemplary embodiment of the invention.
Figure 4:
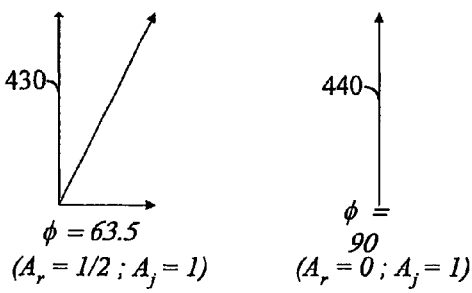

Turning to FIG. 4, graphs useful in demonstrating a weighting operation of antenna weight value generator 320 according to an exemplary embodiment of the invention are shown. Although the scope of the present invention is not limited in this respect, the weighting operation may be graphically described in terms of vector addition. The outputs of the variable-gain amplifiers $A_r$ 326 and $A_i$ 328 may be mutually orthogonal by quadrature mixing in the RF-to-IF downconverter section. Various examples of phase-shifts in the first quadrant are shown, although the scope of the present invention is not limited in this respect, for example, because phase shifts over all four quadrants may be realized. A graph 400 depicts an example of vector summation of the gains of amplifiers 326 and 328, for vector amplitudes $A_r=1$, $A_i=0$ and a phase $\phi=0$. A graph 410 may depict, for example, vector summation of the gains of amplifiers 326 and 328, for vector amplitudes $A_r=1$, $A_i=½$ and a phase $\phi=26.5$. A graph 420 may depict, for example, vector summation of the gains of amplifiers 326 and 328, for vector amplitudes $A_r=1$, $A_i=1$ and a phase $\phi=45$. A graph 430 may depict, for example, vector summation of the gains of amplifiers 326 and 328 for vector amplitudes $A_r=½$, $A_i=1$ and a phase $\phi=63.5$. A graph 440 may depict, for example, vector summation of the gains of amplifiers 326 and 328, for vector amplitudes $A_r=0$, $A_i=1$ and a phase $\phi=90$.

Figure 5:
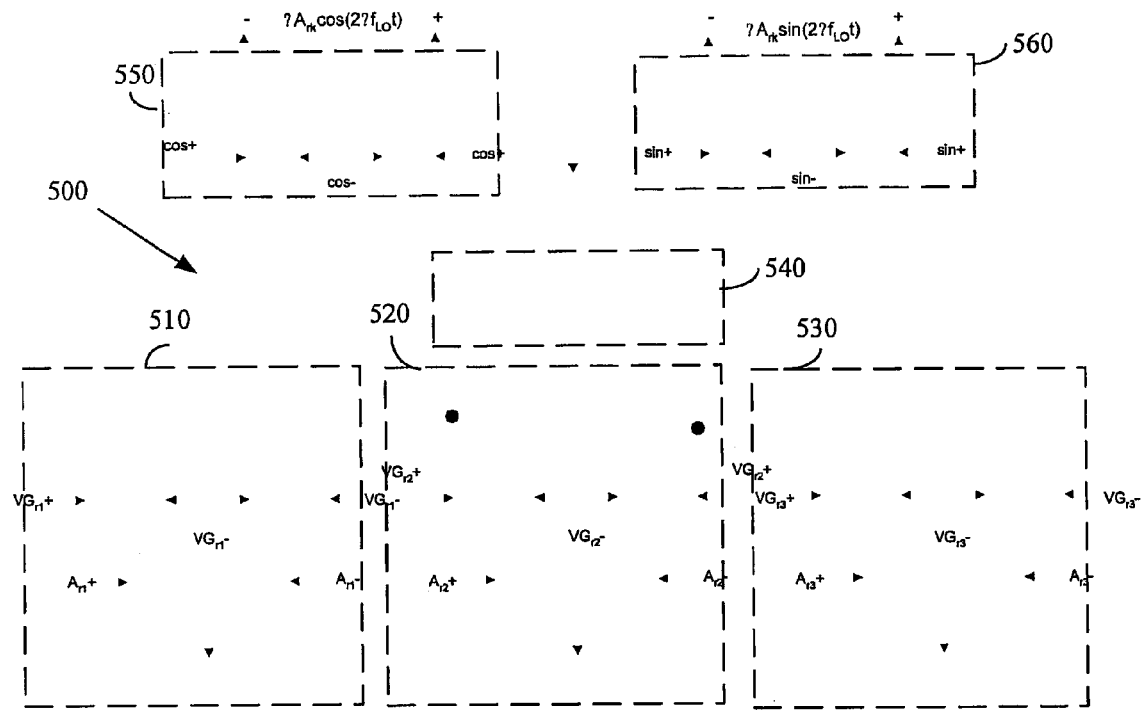
FIG. 5 is an illustration of an implementation of a portion of an antenna receiver according to an exemplary embodiment of the present invention.

Turning to FIG. 5, an illustration of a practical implementation of a portion of an antenna receiver 500 according to an exemplary embodiment of the present invention is shown. Although the scope of the present invention is not limited in this respect, amplifiers $A_{r1}$ 510, $A_{r2}$ 520 and $A_{r3}$ 530 may be implemented using multiple differential pair transistors, for example, complementary metal oxide semiconductor (CMOS) transistors or the like. The variable-gain functionality may be implemented using second differential pair transistors which may be driven by a gain-control signal, denoted VG, for example a voltage signal. The VG signal may cause a portion of the signal current to be diverted to the supply. The currents from the individual amplifiers may be summed and fed into a primary of a transformer 540. A secondary of transformer 540 may be connected to multiplexers 550, 560. For example, multiplexer 550 and/or multiplexer 560 may be implemented using a pair of quadrature devices, for example CMOS transistors, which may together realize quadrature downconversion.

Although the scope of the present invention is not limited in this respect, this portion of antenna receiver 500 may be used for combining the real components of the antenna signals and/or the imaginary components of the antenna signals, as described above. Embodiments of the present invention may use two similar portions of antenna receiver 500. A first portion may be used to combine the real components of the antenna signals and the second portion may be used to combine the imaginary components of the antenna signals.

Figure 6:
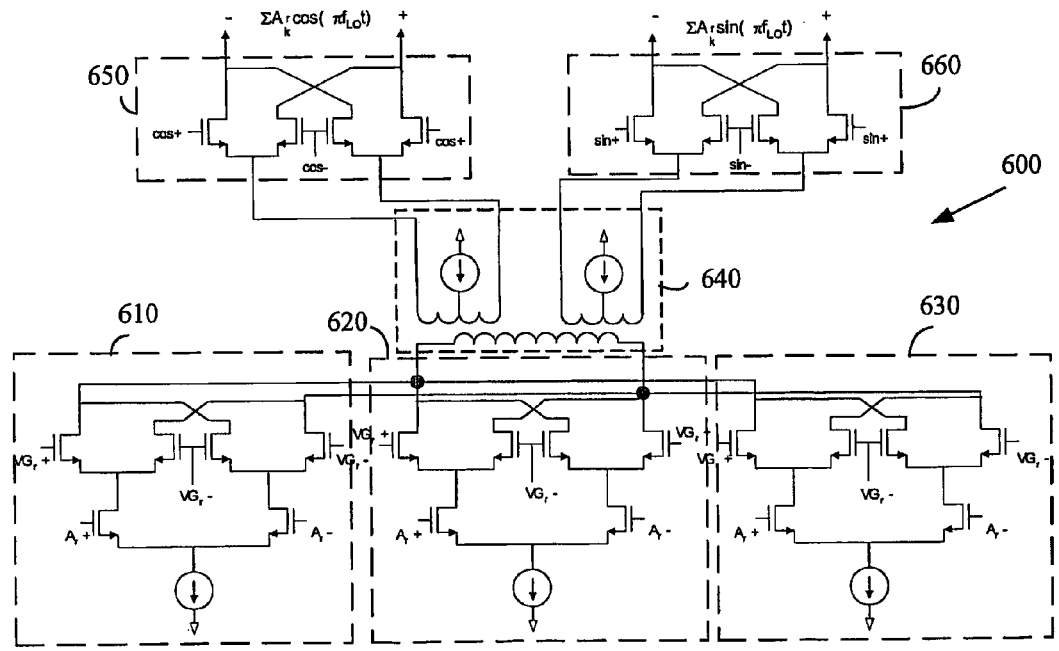
FIG. 6 is an illustration of another implementation of a portion of an antenna receiver according to another exemplary embodiment of the present invention.

Turning to FIG. 6, an illustration of another practical implementation of a portion of an antenna receiver 600 according to an exemplary embodiment of the present invention is shown. Although, the scope of the present invention is not limited in this respect, amplifiers $A_{r1}$ 610, $A_{r2}$ 620 and $A_{r3}$ 630 may be implemented with multiple differential pairs transistors, for example, CMOS transistors or the like. The variable-gain functionality may be implemented using a second differential pair transistors which may be driven by a gain-control signal VG. The VG voltage may cause a portion of the signal current to be diverted to the supply. The currents from the individual amplifiers may be summed and fed into a primary of a transformer 640. In this embodiment of the invention, transformer 640 may be a 2:1:1 transformer, which may include two secondaries. A first secondary of transformer 640 may be connected to multiplexer 650, and a second secondary may be connected to multiplexer 660. Multiplexers 650, 660 may be implemented using a pair of quadrature devices, for example CMOS transistors, which may together realize quadrature downconversion. One notable difference between amplifiers 510, 520, 530 and amplifiers 610, 620 and 630 is the arrangement of the multiple differential pair transistors. Because of their different arrangements, amplifiers 510, 520, 530 may be suitable for some embodiments of the invention and amplifiers 610, 620 and 630 may be suitable for other embodiments of the present invention, if desired.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An antenna receiver coupled to two or more antennas, the antenna receiver comprising:
    a radio frequency (RF) section which includes a first antenna weighted value generator to output a pair of first real and first imaginary antenna weighted radio frequency (RF) signal components, a second antenna weighted value generator to output a pair of second real and second imaginary antenna weighted radio frequency (RF) signal components, a first adder to combine the first and second real radio frequency (RE) signal components, and a second adder to combine the first and second imaginary radio frequency (RF) signal components;
    a radio frequency (RF) to intermediate frequency (IF) quadrature downconverter to receive a combined antenna weighted radio frequency (RF) real signal from said first adder and a combined antenna weighted radio frequency (RF) imaginary signal from said second adder, and to output an in-phase portion and a quadrature portion of an intermediate frequency (IF) signal; and
    an intermediate frequency (IF) to baseband downconverter operably coupled to said radio frequency (RF) to intermediate frequency (IF) quadrature downconverter, to downconvert said in-phase portion and said quadrature portion of said intermediate frequency signal to an in-phase portion and a quadrature portion of a baseband signal.

2. The antenna receiver of claim 1, wherein at least one of the first and second antenna weighted value generators comprises:
    a first variable amplifier to adjust an amplitude of the modulated radio frequency (RF) signals and to output amplitude adjusted modulated radio frequency (RF) signals; and
    second and third variable amplifiers operably coupled to the first amplifier, to adjust the phase of the amplitude adjusted modulated radio frequency (RF) signals,
    wherein said at least one of the first and second antenna weighted value generators is able to generate said antenna weighted value by manipulating a first value derived from an amplitude of the modulated radio frequency (RF) signals and a second value derived from a phase of the modulated radio frequency (RF) signals.

3. The antenna receiver of claim 2, wherein the second variable amplifier is able to provide a real portion of the phase of the antenna weighted value and the third variable amplifier is able to provide an imaginary portion of the phase of the antenna weighted value.

4. An apparatus comprising:
    two or more dipole antennas to receive two or more modulated radio frequency (RF) signals; and
    an antenna receiver coupled to said two or more antennas, wherein the antenna receiver includes:
    a radio frequency (RF) section having a first antenna weighted value generator to output a pair of first real and first imaginary antenna weighted radio frequency (RF) signal component, a second antenna weighted value generator to output a pair of second real and second imaginary antenna weighted radio frequency (RF) signal components, a first adder to combine the first and second real radio frequency (RF) signal components, and a second adder to combine the first and second imaginary radio frequency (RF) signal components;
    a radio frequency (RF) to intermediate frequency (IF) quadrature downconverter to receive a combined antenna weighted radio frequency (RF) real signal from said first adder and a combined antenna weighted radio frequency (RF) imaginary signal from said second adder, and to output an in-phase portion and a quadrature portion of an intermediate frequency (IF) signal; and
    an intermediate frequency (IF) to baseband downconverter operably coupled to said radio frequency (RF) to intermediate frequency (IF) quadrature downconverter, to downconvert said in-phase portion and said quadrature portion of said intermediate frequency signal to an in-phase portion and a quadrature portion of a baseband signal.

5. The apparatus of claim 4, wherein at least one antenna weighted value generator of the first and second antenna weighted value generators comprises:
    a first variable amplifier to adjust an amplitude of the modulated radio frequency (RF) signals and to output amplitude adjusted modulated radio frequency (RF) signals; and
    second and third variable amplifiers operably coupled to the first variable amplifier, to adjust the phase of the amplitude adjusted radio frequency (RF) signals,
    wherein said at least one antenna weighted value generator is able to generate said antenna weighted value by manipulating a first value derived from an amplitude of the modulated radio frequency (RF) signals and a second value derived from a phase of the modulated radio frequency (RF) signals.

6. The apparatus of claim 5, wherein the second variable amplifier is able to provide a real portion of the phase of the antenna weighted value and the third variable amplifier is able to provide an imaginary portion of the antenna weighted value.

7. A communication system comprising:
    a first communication device to transmit a plurality of modulated radio frequency (RF) signals over a plurality of channels;
    a second communication device to receive the plurality of modulated radio frequency (RF) signals by a plurality of antennas operably coupled to an antenna receiver, wherein the antenna receiver comprises:
    a radio frequency (RF) section which includes a first antenna weighted value generator to output a pair of first real and first imaginary antenna weighted radio frequency (RF) signal components, a second antenna weighted value generator to output a pair of second real and second imaginary antenna weighted radio frequency (RF) signal components, a first adder to combine the first and second real radio frequency (RF) signal components, and a second adder to combine the first and second imaginary radio frequency (RF) signal components;
    a radio frequency (RF) to intermediate frequency (IF) quadrature downconverter to receive a combined antenna weighted radio frequency (RF) real signal from said first adder and a combined antenna weighted radio frequency (RF) imaginary signal from said second adder, and to output an in-phase portion and a quadrature portion of an intermediate frequency (IF) signal; and
    an intermediate frequency (IF) to baseband downconverter operably coupled to said radio frequency (RF) to intermediate frequency (IF) quadrature downconverter, to downconvert said in-phase portion and said quadrature portion of said intermediate frequency signal to an in-phase portion and a quadrature portion of a baseband signal.

8. The communication system of claim 7, wherein at least one antenna weighted value generator of the first and second antenna weighted value generators is able to provide an antenna weighted value to the plurality of modulated radio frequency (RF) signals based on a manipulation of a first value derived from an amplitude of a received modulated radio frequency (RF) signal received by an antenna of the plurality of antennas and a second value derived from a phase of the received modulated radio frequency (RF) signal.

9. The communication system of claim 7, wherein the radio frequency (RF) to an intermediate frequency (IF) quadrature downconverter of the antenna receiver is able to provide said in-phase portion and said quadrature portion of said intermediate frequency signal.

10. The communication system of claim 9, wherein the intermediate frequency to a base band frequency downconverter of the antenna receiver is able to provide a real portion and an imaginary portion of a base band frequency signal.

* * * * *